(12) United States Patent
Sultana et al.

(10) Patent No.: US 10,061,918 B2
(45) Date of Patent: Aug. 28, 2018

(54) SYSTEM, APPARATUS AND METHOD FOR FILTERING MEMORY ACCESS LOGGING IN A PROCESSOR

(71) Applicant: Intel Corporation, Santa Clara, CA (US)

(72) Inventors: Salmin Sultana, Hillsboro, OR (US); David M. Durham, Beaverton, OR (US); Michael Lemay, Hillsboro, OR (US); Karanvir S. Grewal, Hillsboro, OR (US); Ravi L. Sahita, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/088,318

(22) Filed: Apr. 1, 2016

(65) Prior Publication Data
US 2017/0286672 A1  Oct. 5, 2017

(51) Int. Cl.
| | |
|---|---|
| G06F 12/14 | (2006.01) |
| G06F 21/55 | (2013.01) |
| G06F 17/30 | (2006.01) |
| G06F 12/1009 | (2016.01) |
| G06F 21/56 | (2013.01) |
| G06F 9/455 | (2018.01) |

(52) U.S. Cl.
CPC ........ *G06F 21/552* (2013.01); *G06F 12/1009* (2013.01); *G06F 12/145* (2013.01); *G06F 17/30424* (2013.01); *G06F 21/55* (2013.01); *G06F 21/56* (2013.01); *G06F 2009/45583* (2013.01); *G06F 2009/45591* (2013.01); *G06F 2212/1052* (2013.01); *G06F 2212/65* (2013.01); *G06F 2221/034* (2013.01)

(58) Field of Classification Search
CPC .. G06F 12/1009; G06F 21/55; G06F 9/45533; G06F 21/566; G06F 21/567; G06F 21/56; G06F 12/14; G06F 12/145; G06F 2009/45591
USPC ............................ 711/152, 263, 206; 726/23
See application file for complete search history.

(56) References Cited

U.S. PATENT DOCUMENTS

| | | | | |
|---|---|---|---|---|
| 2010/0318746 A1* | 12/2010 | Troxel | ................ | G06F 11/1438 711/141 |
| 2014/0181375 A1* | 6/2014 | Miyamoto | .......... | G06F 12/0868 711/103 |

(Continued)

OTHER PUBLICATIONS

Intel Corporation, "Page Modification Logging for Virtual Machine Monitor White Paper", Jan. 2015.*

(Continued)

*Primary Examiner* — Than Nguyen
(74) *Attorney, Agent, or Firm* — Trop, Pruner & Hu, P.C.

(57) ABSTRACT

In one embodiment, a processor comprises: a first storage including a plurality of entries to store an address of a portion of a memory in which information has been modified; a second storage to store an identifier of a process for which information is to be stored into the first storage; and a first logic to identify a modification to a first portion of the memory and store a first address of the first portion of the memory in a first entry of the first storage, responsive to a determination that a current identifier of a current process corresponds to the identifier stored in the second storage. Other embodiments are described and claimed.

13 Claims, 5 Drawing Sheets

(56) References Cited

U.S. PATENT DOCUMENTS

2015/0248557 A1* 9/2015 Sallam .................. G06F 21/554
　　　　　　　　　　　　　　　　　　　　　　　　726/23
2017/0185773 A1* 6/2017 Lemay .................. G06F 21/566

OTHER PUBLICATIONS

Yueqiang Cheng, et al., "ROPecker: A Generic and Practical Approach for Defending Against ROP Attacks," Feb. 2014, 14 pages.
U.S. Appl. No. 14/757,945, filed Dec. 24, 2015, entitled "Techniques for Detecting Malware With Minimal Performance Degradation," by Michael Lemay, et al.
Intel Corporation, "Page Modification Logging for Virtual Machine Monitor White Paper," Jan. 2015, 7 pages.

* cited by examiner

SYSTEM, APPARATUS AND METHOD FOR FILTERING MEMORY ACCESS LOGGING IN A PROCESSOR

TECHNICAL FIELD

Embodiments relate to enhancing security in a computing device.

BACKGROUND

Security violations in computer systems can adversely impact individuals, businesses, and governments in an increasingly technology-dependent world. As examples, malware can exploit memory corruption bugs in software and overwrite relevant aspects such as code pointers, function pointers, exception handlers, non-control data, and so forth, to transfer control flow of a program to a memory address where the attacker has loaded a malicious code stub (shellcode). This shellcode then can be used to allocate additional memory and download a larger piece of unauthorized code, which an attacker causes to execute on a target system to perform malicious tasks. Efforts to counter such attacks may be based on detection of anomalous control flow and memory accesses to provide comprehensive malware detection and prevention.

DETAILED DESCRIPTION

Figure 1:
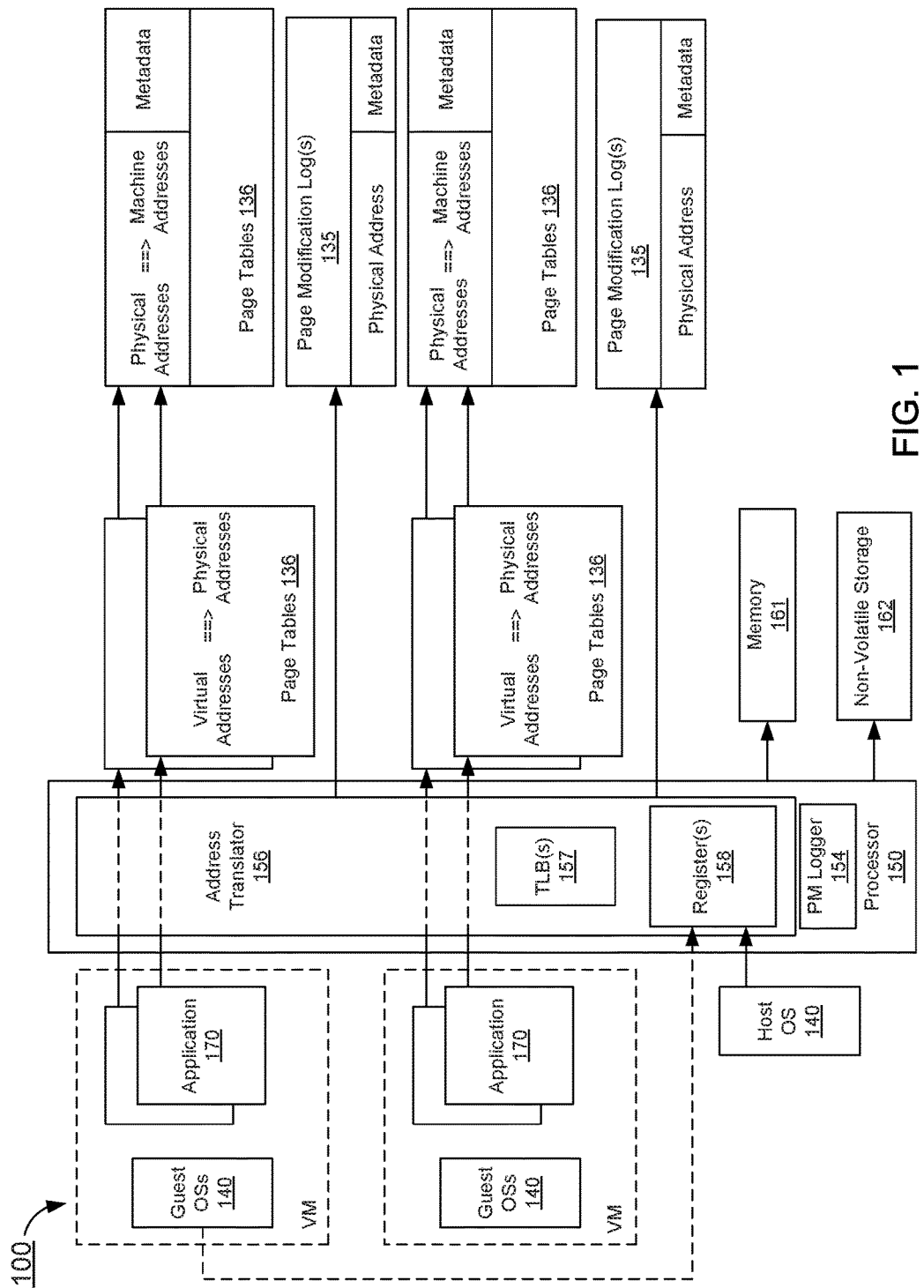
FIG. 1 is a block diagram of a system in accordance with an embodiment of the present invention.

In various embodiments, a processor may be configured to monitor accesses to a memory using logging mechanisms of the processor. To reduce overhead, constrain impact and minimize log size, embodiments may further provide techniques to filter this logging based on a variety of different controls. For example, in different implementations only certain types of accesses may be logged. As examples, one or more of memory access, read access, write access and/or code execution access can be identified. To reduce impact, such logging may be made on the basis of a particular size or portion of a memory, such as a page size. Still further, embodiments provide techniques to filter logging for particular identified processes, which may be user-level processes of a virtualized or non-virtualized environment. Using all of these mechanisms, logging information can be obtained with reduced overhead. Such logging information can be used for various purposes, including for malware detection, and/or machine learning and potential performance optimizations, as described herein.

More specifically, embodiments may utilize a page modification logging (PML) feature in order to track, e.g., page modifications by a particular process in a virtualized environment. In this way, memory modifications of a benign application can be characterized and correlated with a control flow of the application, to detect anomalous memory accesses during application execution.

One embodiment may be implemented in an Intel® Architecture processor having PML implemented within an Intel® Virtualization Technology (Intel® VT) environment. Using the filtering described herein, a virtual machine monitor (VMM) or other hypervisor can efficiently monitor guest physical pages modified during guest virtual machine (VM) execution on an application or process basis. Such logging may be performed during extended page table (EPT) processing when a dirty flag is set in this table. To this end, assuming a currently executing process is configured to log PML information, on each write that sets a dirty flag of the EPT, a corresponding entry may be written in an in-memory log to report the guest physical address of the write, potentially with metadata regarding the access.

In an embodiment, when the log is full, a VM exit can occur to notify the VMM of this condition. In turn, the VMM may cause the full log to be written to a given location, such as a location in a persistent storage associated with the currently executing process, such that log information associated with the process can be maintained over time.

By providing filtering techniques as described herein, fine-grained data may be obtained on a per-process or application basis. To this end, embodiments may provide a filter register or other storage to store an indication of a process for which logging is to be maintained. In some cases, only a single process may be monitored and logged at a time. In other situations, multiple processes may be concurrently logged. In an embodiment, this filter register may be configured to store a process identifier, referred to herein as a control register 3 (CR3) value. Using this filtering capability, a debug/profile tool can specify a particular application to trace.

As such, the generation of PML entries can be enabled or disabled based on the value of CR3. The resulting logs can be scanned to detect malware. Upon detection of malware within one or more pages, a processor may provide an indication of those pages having malware detected therein to a security routine executed by the processor and/or another processor within the system, and/or a processor of a security server to enable further action to be taken. In some cases, the logs may further be used in performing machine learning operations, in an effort to optimize one or more operating parameters of code under analysis.

In some cases, only certain types of accesses, e.g., just reads, just writes, or just code fetches, may be logged. Such additional filter techniques may be used alone or in combination with other types of filters, such as the process filtering described above. Note that in some embodiments, multiple CR3 values may be specified in a filter register, analogous to a CR3 target list feature supported in a given Intel® VT environment. In some cases, one of the reserved bits in a CR3 register may be converted to a control bit that specifies whether PML logging and/or EPT access/dirty bit updates are to be enabled for that CR3 value. By using this feature, an arbitrary number of CR3 values may be efficiently specified in the filter register.

In various embodiments, the number of page modification logs may vary based on such factors as the quantity of processors, the quantity of cores per processors, the quantity of threads of execution supported by each core, whether VMs are instantiated, the quantity of VMs instantiated, the quantity of operating systems (OSs) and/or application routines executed, etc. More specifically, in some embodiments, there may be a single page modification log, regardless of how many cores, threads of execution, VMs, OSs and/or application routines. However, under particular circumstances, either the single page modification log may be increased in size or additional page modification log(s) may be instantiated. In other embodiments in which the processor incorporates multiple cores and/or supports multiple threads of execution in supporting multiple VMs, there may be one page modification log per core, per thread of execution, per VM, per OS and/or per application routine.

In some embodiments, a memory management unit including an address translator may define the locations of each page modification log within a memory, and may generate the entries within each page modification log based on translations of virtual addresses to physical addresses performed by the address translator in support of operations into pages at address locations originally specified by the virtual addresses. Where multiple VMs are supported by the processor, the address translator may define the locations of separate page modification log(s) for each VM, and may generate entries within different ones of those page modification logs based on translations of virtual addresses to physical and/or machine addresses in support of write operations into pages at address locations associated with different ones of the VMs.

In some embodiments, the granularity of storage space associated with the entries of the page modification log(s) may be identical to that associated with the entries of page table(s) that are walked by the address translator. By way of example, in a processor having an Intel® Architecture design, each page may be four kilobytes in size and entries within page tables and within each page modification log may be associated with single four kilobyte pages. However, in other embodiments, the granularity of storage space associated with entries of the page modification log(s) may be of a different granularity.

Referring now to FIG. 1, shown is a block diagram of a system in accordance with an embodiment. As shown, in system 100, which may be any type of computing device, a processor 150 executes instructions of a host OS 140 and/or of a guest OS(s) 140 (in a virtualization environment) to provide one or more operating environments in which one or more application routines 170 may be executed. Processor 150, host OS 140 and/or guest OS(s) 140 may cooperate to divide the storage space within a memory 161 (such as a dynamic random access memory (DRAM)) into numerous pages and to provide virtual addressing. As familiar to those skilled in the art of virtual addressing, pages containing portions of data and/or portions of executable routines may be swapped between the storage space within the memory and within a non-volatile storage 162 based on which pages contain portions of data and/or portions of executable routines that have been accessed more recently. As part of providing such support, processor 150 may generate and maintain one or more page tables 136 within a portion of memory 161 for use in converting between virtual and physical addresses, and/or one or more page modification logs 135 within a portion of memory 161 for use in tracking at least certain recent accesses to pages currently within memory 161.

Processor 150 incorporates at least one processor core to execute instructions of an executable routine in at least one thread of execution. An address translator 156 may provide support for the use of virtual addressing including interaction with page tables 136 and page modification logs 135 as part of tracking recent accesses to pages currently within memory 161. To this end, address translator 156 may include or be coupled to a page modification logger 154. Page modification logger 154 may be configured to write an entry into a given page modification log 135 responsive to determining that appropriate filtering criteria have been met, as described herein.

Where host OS 140 cooperates with processor 150 to employ virtual addressing, an application routine 170 executed within an operating environment provided by host OS 140 (or host OS 140, itself) may perform a read or write access to a storage location (e.g., the location of a byte, word, doubleword, quadword, etc.) within a page within memory 161 while referring to that storage location with a virtual address. That virtual address may be provided to address translator 156, which may walk page table(s) 136 to reach an entry which correlates that virtual address to a corresponding physical address. Each such entry may include one or more flag bits that may be set and/or reset to provide various indications of status for each page. Among those flag bits may be a "dirty" bit that provides an indication that at least one byte of storage space within a corresponding page within memory 161 has been written to since the last occasion on which such flag bits so associated with that page were cleared. Thus, upon locating that entry, the dirty bit among the flag bits of that entry may be set to indicate that at least one byte of that page has been written to if the access made by application routine 170 (or by host OS 140, itself) is a write access. Additional similarly configured flag bits may be provided, including an "accessed" bit to indicate access to the page, a "read" bit to indicate that the page has been read, and an "execute" bit to indicate that code from the page has been executed.

As additionally depicted, each of page modification logs 135 may be made up of numerous entries in which a range of physical addresses (or other identifier) of a page may be stored. In some embodiments, an entry may be added to a page modification log 135 as a result of at least a byte being written to a page such that the presence of an entry indicates a write access was made. In other embodiments, an entry may also be generated within a page modification log 135 to record one or more other events affecting a page (such as a read, or execution of code obtained from the page) thereto. To provide an indication of the type of event that resulted in the generation of each entry in page modification log(s) 135, in such other embodiments, each entry of page modification log(s) 135 may include metadata or flag bits that may be similar to those within entries of page table(s) 136, including corresponding dirty accessed, read and execute bits, in an embodiment.

As still further depicted, and as familiar to those skilled in the art, address translator 156 may include one or more translation lookaside buffers (TLBs) 157 that store entries similar to those of page table(s) 136 for a limited quantity of the most recently accessed pages, to each lower latency access to search information.

Returning to FIG. 1, in some embodiments, host OS 140 may incorporate routines to implement virtual machines (VMs), and any one of guest OS(s) 140 (and/or multiple instances of a single guest OS 140) may be executed within each of those VMs. In such embodiments, host OS 140 may be referred to as a virtual machine manager (VMM) or hypervisor. Within each VM, one or more application routines 170 may be executed in the operating environment provided by the execution of a guest OS 140 within that VM. VMs may cause provision of two layers of address translation in which there may be separate translating between virtual addresses and physical addresses for each application 170 (and/or the guest OS 140) executed within each VM, as well as translating between the physical addresses for each of the VMs and machine addresses that represent the actual addresses of the storage locations in memory 161. This situation arises from the fact that each guest OS 140 executed within one of the VMs may not be aware that the physical address space within each VM is itself a virtualization of the actual address space of hardware components.

Page tables 136 and/or page modification log(s) 135 are provided in a two layer configuration where VMs are provided to support the execution of multiple guest OSs 140 and/or multiple instances of a single guest OS 140. In various embodiments, multiple guest OSs 140 that are each executed within a separate VM and/or multiple instances of a single OS 140 that are each executed within a separate VM, in addition to host OS 140, may cooperate with address translator 156 to generate a nested set of page tables 136 and/or one or more page modification logs 135.

As depicted, something of a tree-like arrangement of page tables 136 may result where the physical addresses that the virtual addresses associated with each application routine 170 (and/or for each guest OS 140) are translated to are then routed to one or more page tables 136 at which those physical addresses are translated to machine addresses. Thus, where a particular application routine 170 (or a guest OS 140) executed within a particular VM makes a read or write access employing a virtual address based on the virtual address space within that VM, address translator 156 may use a page table 136 associated with that application routine 170 within that VM to translate that virtual address into a physical address associated with that same VM. Then, address translator 156 may use an additional page table 136 generated in cooperation with host OS 140 to translate that physical address associated with that VM into a machine address. In so doing, if the access is a write access, then address translator 156 may set a dirty bit within the entry from which the machine address is obtained to indicate the page has been written to. Further, as depicted, one or more page modification logs 135 may be associated with that additional page table(s) 136 employed in translating physical addresses for that VM to machine addresses. Thus, if the access is a write access, then in addition to setting a dirty bit within an entry of such a page table 136, the address translator 156 may also generate an entry within a page modification log 135 and may set a corresponding dirty bit therein. Similar operations may be performed to write additional metadata in page tables 136 and page modification logs 135 as described herein.

Note that while the entries of page modification log(s) 135 may provide information that is redundant to the information provided in the entries of page table(s) 136, the organization of the entries in page modification log(s) 135 may, unlike the entries within page table(s) 136, be chronological in nature. Stated differently, unlike page table(s) 136, the order of the entries within page modification log(s) 135 in conjunction with the flag bits included within each entry may provide an indication of the order in which events affecting pages within memory 161 (including write accesses) occurred. By way of example, in other embodiments, page modification log(s) 135 may each be made up of a bit field in which combinations of bits representing pages that have been written to are set through use of a Bloom filter incorporated into address translator 156 of processor 150 and/or another component of the processor.

Figure 2:
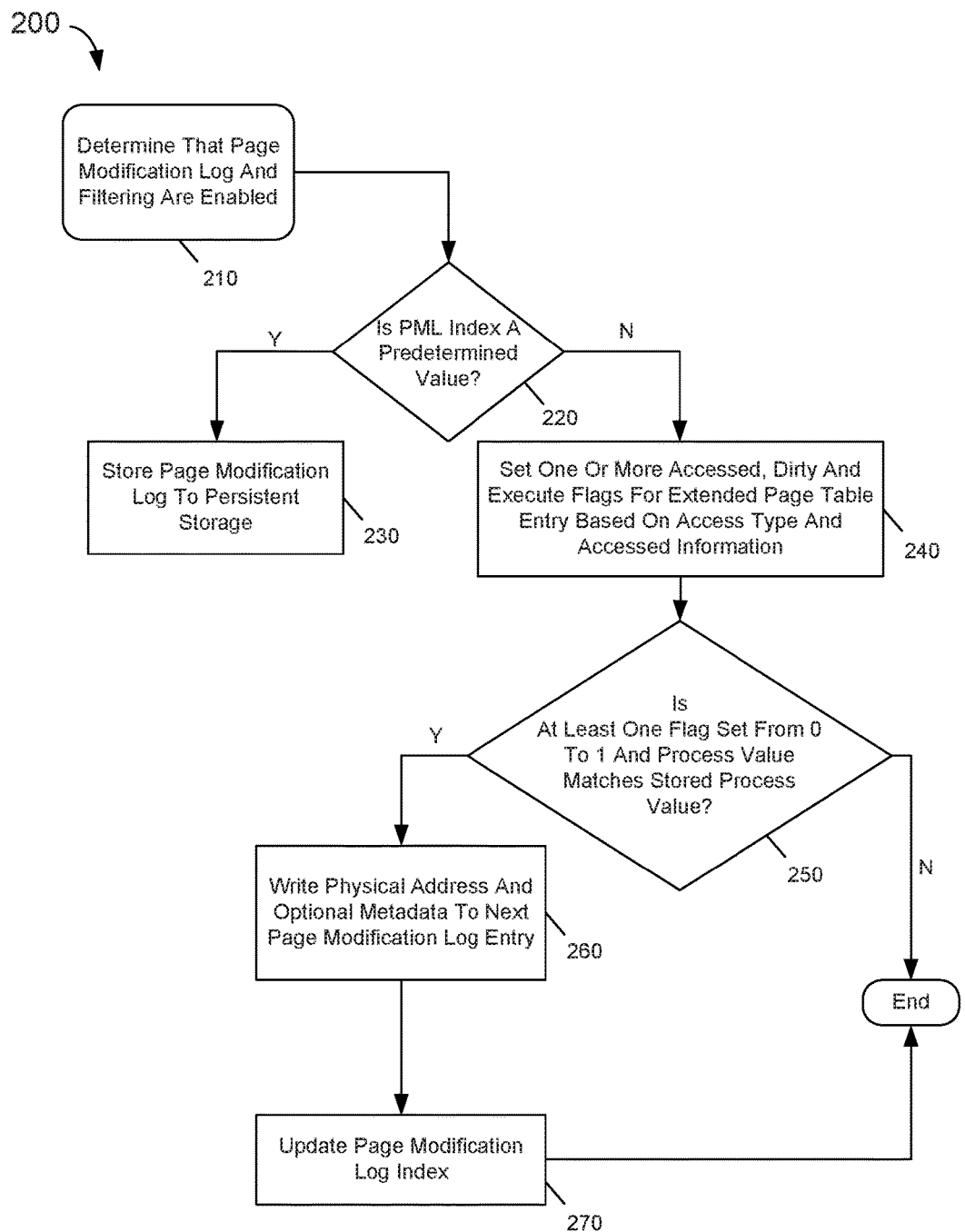
FIG. 2 is a flow diagram of a method in accordance with an embodiment of the present invention.

Referring now to FIG. 2, shown is a flow diagram of a method in accordance with an embodiment of the present invention. Method 200 may be performed by hardware, software, and/or firmware of a processor having a page modification mechanism as described herein. Method 200 may be performed by hardware circuitry of the processor, such as address translation logic or so forth when a given access to a memory page is identified. More specifically, method 200 begins by determining that a page modification log is enabled for use (block 210). The determination may also include determining that filtering of writes to this page modification log also is enabled. Such filtering may, in an embodiment, be directed to filtering writes for a particular process, such as an active process as identified in a CR3 register or other storage location.

Control passes from block 210 to diamond 220 to determine whether an index value for the PML is a predetermined value. In embodiments, the PML may be arranged having multiple entries each associated with an index. For example, in an embodiment having a 512 entry PML, the first entry may have an index of 0 and the last entry may have an index of 511. In an embodiment, the predetermined value may correspond to a value of 511, meaning that the PML is full (in an implementation in which PML entries are written in decrementing fashion beginning with entry 511). Note that in some embodiments, a persistent storage may provide a backing store for PMLs. Further, the backing store may be arranged by a processor such that various processes may include one or more sets of PML data, as written to the backing store when the PML is full (or on a context switch from the process, in some cases). Thus if the PML index corresponds to this predetermined value, control passes to block 230 where the information in the PML may be stored to a persistent storage. In a virtualization embodiment, an affirmative determination at diamond 230 may cause a VM exit to enable a VMM or other hypervisor to perform this write of the full PML to persistent storage.

Otherwise, if the PML index is not at the predetermined value, control passes to block 240. At block 240, one or more of multiple flags of an extended page table entry may be set. In an embodiment, an extended page table may include, among other flags, accessed, dirty and execute flags. The accessed flag may be set to indicate an access to an address within the corresponding page of the memory. The dirty flag may be set to indicate a write access to an address within the corresponding page of the memory. In turn, the execute flag may be set to indicate that code accessed from an address within the corresponding page of the memory is to be executed. As such, depending on a particular access, the accessed flag and potentially one or more other flags may be set. Control next passes to diamond 250. At diamond 250 it can be determined whether at least one of these flags of the associated page was set by the above operation from a reset to set state (e.g., logic 0 to logic 1). Still further, the determination at diamond 250 also considers whether the current process value for an active process (namely the process that issued the memory access request) matches a stored process value. More specifically, this current process value (e.g., present in a CR3 register) is compared to a process value stored in a filter register associated with the PML. This filter register thus identifies a process for which PML entries are to be validly written. Instead, for accesses including modification accesses that are not associated with this process, no PML update occurs. Thus the determination at diamond 250 performs two different filter operations, namely: (a) a first filter operation to enable only a first modification (or other access) to a page to be written to the PML; and (b) a second filter operation to only write values associated with one process. Thus if either of these determinations at diamond 250 is in the negative, no further actions with regard to PML activity are taken as to this access.

Still with reference to FIG. 2, if instead both of these determinations are in the affirmative, control passes to block 260 where an entry may be written to the PML. More specifically, a physical address may be written to a next PML entry. And optionally, metadata also may be written to this entry. For example, in some cases a PML may include fields for storage of metadata information, including an indication of the type of access for which the PML entry is written. In one embodiment, a single bit field may be provided, which may be set to a logic 1 or active state to indicate a modification access to the page and instead may be reset to a logic 0 or inactive state to indicate a read access to the page. In other cases, an additional field may be provided to indicate, when set, that execution code was accessed from the page. After writing information to a given entry of the PML at block 260, control passes to block 270 where the PML index may be updated, e.g., by decrement to enable the PML to be ready to receive a next update. Understand while shown at this high level in the embodiment of FIG. 2, many variations and alternatives are possible.

In one embodiment, the filtering techniques described herein may be enabled based on an execution control indicator, which can be used along with the filter register. In one embodiment, a 64-bit guest state machine specific register (MSR) named 'IA32_VMX_CR3_MATCH' and a secondary processor-based VM-execution control indicator, which may be stored in a virtual machine control structure (VMCS), named 'enable CR3Filter' are provided. To trace for only a single CR3 value, software can write that value to the 'IA32_VMX_CR3_MATCH' MSR, and set 'enable CR3Filter'. When the CR3 value of the currently executing process does not match the 'IA32_VMX_CR3_MATCH' MSR, PML entries are not generated, allowing uninteresting information to be removed from a trace. In an embodiment, an attempt to set this CR3 value when the enable indicator is not zero may result in an unauthorized write and hence an exception may be triggered, which may cause a general-protection fault (#GP).

In an embodiment, during a VM entry, it may be determined whether the 'activate secondary controls' and 'enable CR3Filter' VM-execution controls are both 1. In this event, it may be determined during a VM entry that: the 'enable EPT' VM-execution control is 1; the 'enable PML' VM-execution control is 1; bits 11:0 of the PML address are 0; and the PML address does not set any bits beyond the processor's physical address width.

In an embodiment, to identify that a processor is configured to perform the PML filtering operations described herein, a VMX capability reporting mechanism may cause: bit 19 of the secondary processor-based VM-execution controls to be defined as 'enable CR3Filter'; and a processor that supports the 1-setting of 'enable CR3Filter' sets bit 5 (=32+19) of the IA32_VMX_PROCBASED_CTLS2 MSR (index 48BH), and that a read of that MSR returns 1 in bit 19 of EDX.

Note that in some embodiments, a page modification by the specified application may be missed in the PML log if an excluded (non-monitored CR3) process writes to a page, causing the dirty bit to be set, and a subsequent write to that page happens from the desired process. To enable correct logging of such access, one of several techniques may be applied: (i) disable EPT accessed/dirty bit updates when the current CR3 value does not match the filter value; and/or (ii) every time a page is modified, update the dirty bit and consequently the CR3 value will be checked with the 'IA32_VMX_CR3_MATCH' value to generate a PML entry.

Figure 3:
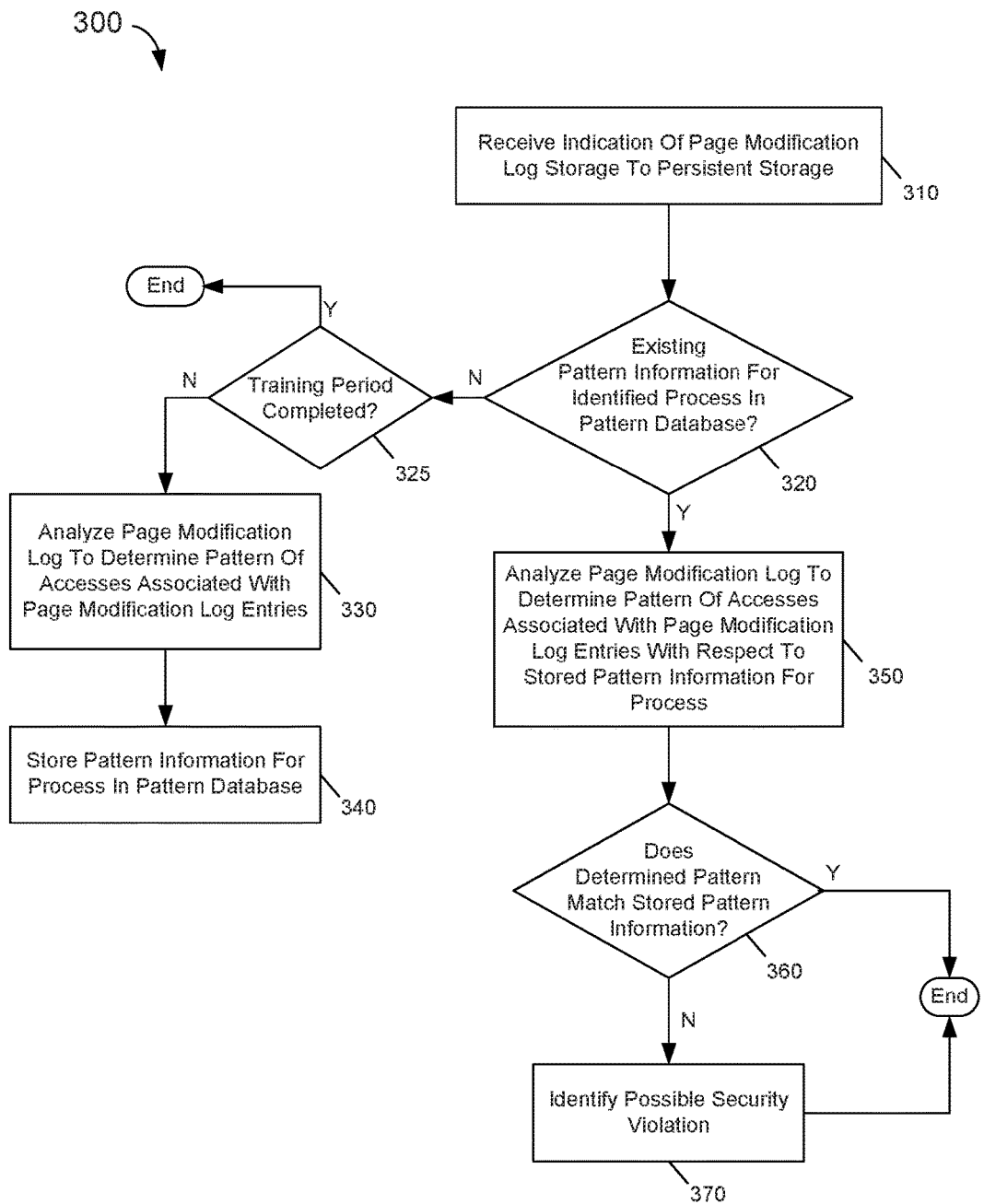
FIG. 3 is a flow diagram of a method in accordance with another embodiment of the present invention.

Referring now to FIG. 3, shown is a flow diagram of a method in accordance with another embodiment of the present invention. More specifically, method 300 of FIG. 3 may be used to leverage the information obtained via a PML to determine whether a potential security issue such as malware execution or other improper access has occurred. In embodiments, method 300 may be performed by security logic, such as antivirus (AV) hardware, software and/or firmware (generically AV logic), including scanning logic to analyze information obtained from a PML to determine whether an improper access has occurred. In the embodiment shown in FIG. 3, method 300 may begin at block 310 by receiving an indication of PML storage to a persistent storage. That is, in the embodiment shown this AV logic may be initiated responsive to a write to a backing store of a set of PML entries (e.g., when the PML becomes full, as discussed above). At diamond 320 it can be determined whether there is an existing log for the identified process. That is, the backing store may include various sets of PMLs each associated with a given process. For a newly spawned process, there may be no PML information available, and as such control passes to diamond 325 to determine whether a training period has completed. If so, no further action is taken as to this newly written log. Otherwise, control passes to block 330. At block 330 the information from the PML may be analyzed to determine a pattern of accesses associated with the PML entries. For example, the analysis may consider whether regular accesses of a particular type, e.g., write operations, are made to allowable portions of a memory or so forth. After such analysis, the pattern information can be stored for the process in a pattern database (block 340). Note that this pattern database may be associated with the AV logic so that it can be accessed and used in further operations as discussed herein.

More specifically, FIG. 3 further includes analyses performed when an existing log is present in this pattern database for an identified process. In such instances, control passes from diamond 320 to block 350. At block 350 the newly received PML entries can be analyzed to determine a pattern of accesses of these entries with respect to the stored pattern information for the process. Then at diamond 360 it can be determined whether the determined pattern matches the stored pattern information. If so, this is an indication that the accesses are as expected and as such, no security concern exists. In this case no further action is taken. Otherwise, if it is determined at diamond 360 that the determined pattern does not match stored pattern information, control passes to block 370. At block 370, a possible security violation may be identified. For example, AV logic may raise a security exception or other flag, e.g., to system software. Understand that responsive to this indication of a potential security violation one or more security policies may be enforced. As examples, a message can be sent, e.g., to an administrator to indicate the potential security violation. Or the identified process can be terminated, among other such actions. Understand while shown at this high level in the embodiment of FIG. 3, the scope of the present invention is not limited in this regard.

Figure 4:
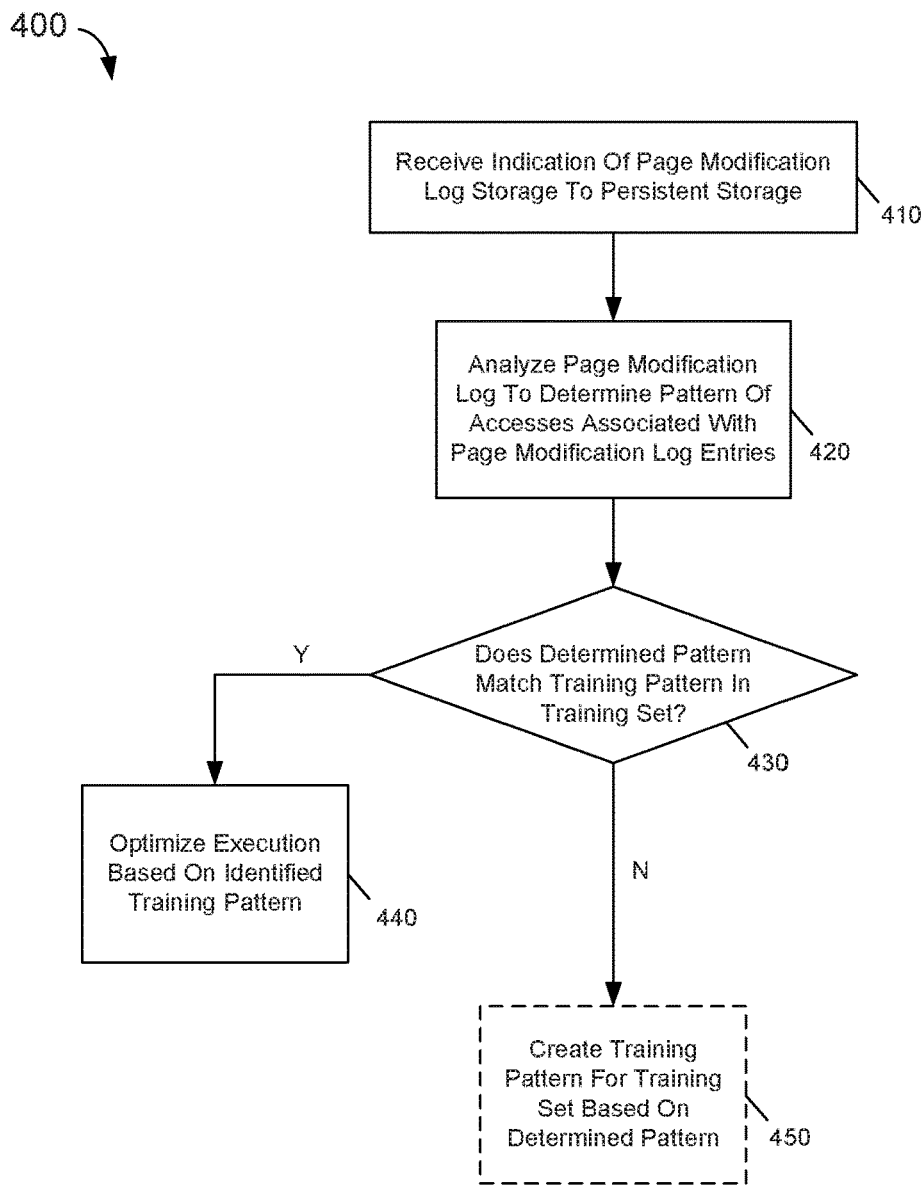
FIG. 4 is a flow diagram of a method in accordance with yet another embodiment of the present invention.

Referring now to FIG. 4, shown is a flow diagram of a method in accordance with yet another embodiment of the present invention. More specifically method 400 of FIG. 4 may be used in performing machine learning with regard to leveraging information stored in a PML, such that a machine learning classifier can determine, based at least in part on PML information, whether accesses occurring within a process match accesses of training set information. Upon such determination, code execution may be optimized in various ways. Still further, other uses for such identification of a type of workload being executed by a given processor according to this machine learning classification also may exist.

In embodiments, method 400 may be performed by machine learning logic, such as may be embedded in a given processor such as by way of hardware, software and/or firmware. In the embodiment shown in FIG. 4, method 400 may begin at block 410 by receiving an indication of PML storage to a persistent storage. At block 420 the page modification log can be analyzed to determine a pattern of accesses associated with the entries of the log (block 420).

Still referring to FIG. 4, at diamond 430 it may be determined whether the determined pattern matches a training pattern within a training set. If so, control passes to block 440. At block 440, execution may be optimized based on the identified training pattern. Understand that in different implementations, a variety of different types of optimization techniques, including code optimization (e.g., execution of translated code), control of various processor features such as branch predictors (e.g., enable or disable) or so forth, among many other potential optimizations, can occur.

Still with reference to FIG. 4, if it is instead determined that the pattern determined from the PML analysis does not match any training pattern within a training set, control may pass to block 450. At this optional operation, a training pattern can be created for the training set based on this determined pattern. As such, a training set can be dynamically updated during processor operation. Understand while shown at this high level in the embodiment of FIG. 4, many variations and alternatives are possible.

Embodiments enable reduced overhead since memory accesses are tracked in a page-granularity and hence can be used in an efficient and practical manner to track memory touch points. In this way, embodiments provide useful for monitoring information with reduced overhead compared to other approaches such as data flow integrity operations, such as taint tracking.

Embodiments may be used to improve malware detection by analyzing page modifications (and/or other memory accesses) of an application and correlating the memory accesses with a legitimate control flow graph of the application. If a violation is indicated, a given detection handler can issue a detection notification regarding an anomalous memory access. Embodiments combined with other security features provide a holistic approach to detect malware activity on a computing platform.

Figure 5:
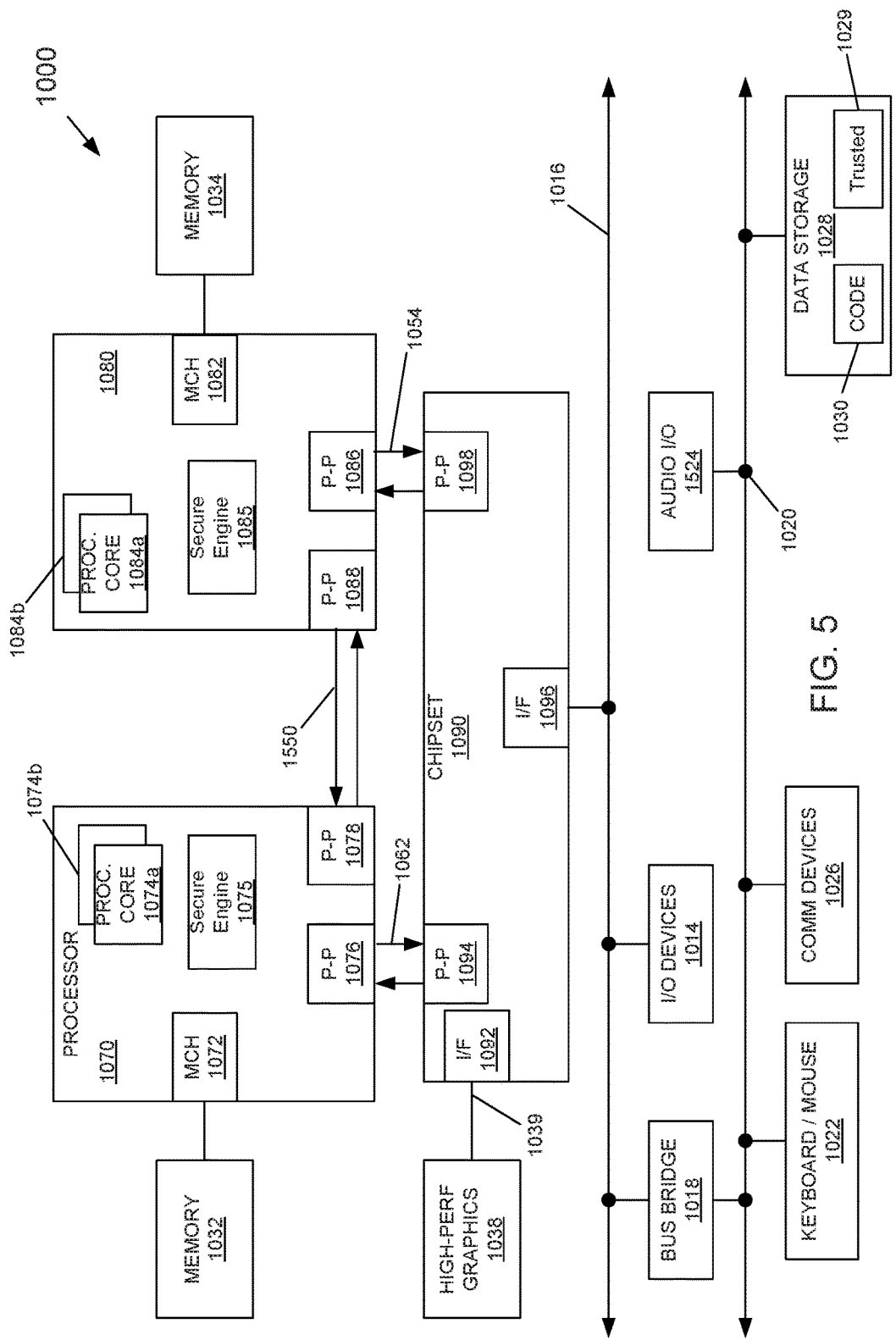
FIG. 5 is a block diagram of a system in accordance with another embodiment of the present invention.

Referring now to FIG. 5, shown is a block diagram of a system in accordance with another embodiment of the present invention. As shown in FIG. 5, multiprocessor system 1000 is a point-to-point interconnect system such as a server system, and includes a first processor 1070 and a second processor 1080 coupled via a point-to-point interconnect 1050. As shown in FIG. 5, each of processors 1070 and 1080 may be multicore processors such as SoCs, including first and second processor cores (i.e., processor cores 1074a and 1074b and processor cores 1084a and 1084b), although potentially many more cores may be present in the processors. In addition, processors 1070 and 1080 each may include a secure engine 1075 and 1085 to perform security operations. In some cases, the secure engine may perform AV-based analysis of PML information as described herein, to identify security violations and take appropriate action, e.g., according to a given security policy.

Still referring to FIG. 5, first processor 1070 further includes a memory controller hub (MCH) 1072 and point-to-point (P-P) interfaces 1076 and 1078. Similarly, second processor 1080 includes a MCH 1082 and P-P interfaces 1086 and 1088. As shown in FIG. 5, MCH's 1072 and 1082 couple the processors to respective memories, namely a memory 1032 and a memory 1034, which may be portions of main memory (e.g., a DRAM) locally attached to the respective processors. First processor 1070 and second processor 1080 may be coupled to a chipset 1090 via P-P interconnects 1052 and 1054, respectively. As shown in FIG. 5, chipset 1090 includes P-P interfaces 1094 and 1098.

Furthermore, chipset 1090 includes an interface 1092 to couple chipset 1090 with a high performance graphics engine 1038, by a P-P interconnect 1039. In turn, chipset 1090 may be coupled to a first bus 1016 via an interface 1096. As shown in FIG. 5, various input/output (I/O) devices 1014 may be coupled to first bus 1016, along with a bus bridge 1018 which couples first bus 1016 to a second bus 1020. Various devices may be coupled to second bus 1020 including, for example, a keyboard/mouse 1022, communication devices 1026 and a data storage unit 1028 such as a non-volatile storage or other mass storage device. As seen, data storage unit 1028 may include code 1030, in one embodiment. As further seen, data storage unit 1028 also includes a trusted storage 1029 to store sensitive information to be protected. Further, an audio I/O 1024 may be coupled to second bus 1020. Of course, understand that embodiments may be used in many different types of systems.

The following Examples pertain to further embodiments.

In Example 1, a processor comprises: a first storage including a plurality of entries to store an address of a portion of a memory in which information has been modified; a second storage to store an identifier of a process for which information is to be stored into the first storage; and a first logic to identify a modification to a first portion of the memory and store a first address of the first portion of the memory in a first entry of the first storage, responsive to a determination that a current identifier of a current process corresponds to the identifier stored in the second storage.

In Example 2, the first logic is to not store the first address in the first entry of the first storage, responsive to a determination that the current identifier of the current process does not correspond to the identifier stored in the second storage.

In Example 3, the first logic is to store the first address further responsive to a determination that a write access to the first portion of the memory set a dirty indicator of a page table entry associated with the first portion of the memory.

In Example 4, the first logic is to store one or more metadata into one or more metadata fields of the first entry of the first storage.

In Example 5, the one or more metadata fields comprise an execute field to indicate whether code of the first portion of the memory has been executed and a read field to indicate whether information of the first portion of the memory has been read.

In Example 6, the processor of one or more of the above Examples further comprises a second logic to store the plurality of entries of the first storage to a persistent storage, responsive to a determination that an index of the first storage is a predetermined value.

In Example 7, the processor of Example 6 is to access the persistent storage to identify a potential security violation, based at least in part on analysis of the plurality of entries stored to the persistent storage from the first storage.

In Example 8, the processor of Example 7 is to compare an access pattern of the current process based on the plurality of entries to stored pattern information associated with the current process to identify the potential security violation.

In Example 9, the processor is to determine an access pattern of the current process based at least in part on the plurality of entries stored in the first storage, and identify whether the access pattern matches at least one stored access pattern of a pattern database.

In Example 10, the processor is to optimize one or more operating parameters responsive to a determination that the access pattern of the current process matches the at least one stored access pattern of the pattern database.

In Example 11, a method comprises: responsive to a first access to a page of a memory, determining whether a first indicator of a page table entry associated with the page has been set and whether a process value stored in a filter storage matches a current process value; and responsive to determining that the first indicator has been set and that the process value matches the current process value, writing an address of the page to a first entry of a first storage to indicate that the first access to the page occurred.

In Example 12, the method further comprises determining whether an index value of the first storage is a predetermined value and, responsive determining that the index value is the predetermined value, writing a plurality of entries of the first storage to a backing store, the backing store comprising a non-volatile storage.

In Example 13, the method further comprises causing a virtual machine exit to a hypervisor, to perform the write to the backing store.

In Example 14, the method further comprises updating an index value of the first storage after the write to the first entry.

In Example 15, the method further comprises determining that a filter enable indicator is set, prior to determining whether the process value matches the current process value.

In Example 16, the method further comprises: responsive to a read access to read execution code from a second page of the memory, determining whether an execute indicator of a page table entry associated with the second page has been set and whether the process value stored in the filter storage matches the current process value; and responsive to determining that the execute indicator has been set and that the process value matches the current process value, writing an address of the second page to a second entry of the first storage to indicate that the read access to the second page occurred.

In Example 17, the method further comprises disabling an update to a page table entry responsive to a write access when the process value stored in the filter storage does not match the current process value.

In another example, a computer readable medium including instructions is to perform the method of any of the above Examples.

In another example, a computer readable medium including data is to be used by at least one machine to fabricate at least one integrated circuit to perform the method of any one of the above Examples.

In another example, an apparatus comprises means for performing the method of any one of the above Examples.

In Example 18, a system comprises: a processor including a first register to store a process value for a process for which page modification logging is to be enabled, and a page modification logger to write an entry into a page modification log when a modification access to a page of a memory is performed in an active process, responsive to a determination that an identifier of the active process corresponds to the process value stored in the first register; and the memory coupled to the processor, where the memory is to store at least a portion of the page modification log.

In Example 19, the system further comprises a persistent storage, where the processor further comprises a logic to store a plurality of entries of the page modification log to the persistent storage, responsive to a determination that an index of the page modification log is a predetermined value.

In Example 20, the processor comprises a security logic to determine an access pattern of the active process based on a plurality of entries of the page modification log and compare the access pattern to stored pattern information associated with the active process to identify a potential security violation.

In Example 21, an apparatus comprises: a first storage means including a plurality of entries for storing an address of a portion of a memory in which information has been modified; a second storage means for storing an identifier of a process for which information is to be stored into the first storage; and means for identifying a modification to a first portion of the memory and storing a first address of the first portion of the memory in a first entry of the first storage means, responsive to a determination that a current identifier of a current process corresponds to the identifier stored in the second storage means.

In Example 22, the means for identifying is to not store the first address in the first entry of the first storage means, responsive to a determination that the current identifier of the current process does not correspond to the identifier stored in the second storage means.

In Example 23, the means for identifying is to store the first address further responsive to a determination that a write access to the first portion of the memory set a dirty indicator of a page table entry associated with the first portion of the memory.

In Example 24, the means for identifying is to store one or more metadata into one or more metadata fields of the first entry of the first storage means.

Understand that various combinations of the above Examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a second storage to store an identifier of a particular process to be executed on the processor for which information is to be stored into a first storage, the first storage including a plurality of entries to store an address of a portion of a memory in which information has been modified;
a first logic to identify a modification to a first portion of the memory and store a first address of the first portion of the memory in a first entry of the first storage, responsive to a determination that a process identifier of a current process corresponds to the identifier stored in the second storage; and
a second logic to store the plurality of entries of the first storage to a persistent storage, responsive to a determination that an index of the first storage is a predetermined value.

2. The processor of claim 1, wherein the first logic is to not store the first address in the first entry of the first storage, responsive to a determination that the process identifier of the current process does not correspond to the identifier stored in the second storage.

3. The processor of claim 1, wherein the first logic is to store the first address further responsive to a determination that a write access to the first portion of the memory set a dirty indicator of a page table entry associated with the first portion of the memory.

4. The processor of claim 1, wherein the first logic is to store one or more metadata into one or more metadata fields of the first entry of the first storage.

5. The processor of claim 4, wherein the one or more metadata fields comprise an execute field to indicate whether code of the first portion of the memory has been executed and a read field to indicate whether information of the first portion of the memory has been read.

6. At least one non-transitory computer readable storage medium comprising instructions that when executed enable a system to:
responsive to a first access to a page of a memory, determine whether a first indicator of a page table entry associated with the page has been set and whether a process value stored in a filter storage of a processor matches a current process value;
responsive to a determination that the first indicator has been set and that the process value matches the current process value, write an address of the page to a first entry of a first storage to indicate that the first access to the page occurred; and
determine whether an index value of the first storage is a predetermined value and, responsive to a determination that the index value is the predetermined value, write a plurality of entries of the first storage to a backing store, the backing store comprising a non-volatile storage.

7. The at least one non-transitory computer readable medium of claim 6, further comprising instructions that when executed enable the system to cause a virtual machine exit to a hypervisor, to perform the write to the backing store.

8. The at least one non-transitory computer readable medium of claim 6, further comprising instructions that when executed enable the system to update the index value of the first storage after the write to the first entry.

9. The at least one non-transitory computer readable medium of claim 6, further comprising instructions that when executed enable the system to determine that a filter enable indicator is set, prior to the determination of whether the process value matches the current process value.

10. The at least one non-transitory computer readable medium of claim 6, further comprising instructions that when executed enable the system to:
responsive to a read access to read execution code from a second page of the memory, determine whether an execute indicator of a page table entry associated with the second page has been set and whether the process value stored in the filter storage matches the current process value; and
responsive to a determination that the execute indicator has been set and that the process value matches the current process value, write an address of the second page to a second entry of the first storage to indicate that the read access to the second page occurred.

11. The at least one non-transitory computer readable medium of claim 6, further comprising instructions that when executed enable the system to disable an update to a page table entry responsive to a write access when the process value stored in the filter storage does not match the current process value.

12. A system comprising:
a processor including a first register to store a process value for a process for which page modification logging is to be enabled, and a page modification logger to write an entry into a page modification log when a modification access to a page of a memory is performed in an active process, responsive to a determination that an identifier of the active process corresponds to the process value stored in the first register;
the memory coupled to the processor, wherein the memory is to store at least a portion of the page modification log; and
a persistent storage, wherein the processor further comprises a logic to store a plurality of entries of the page modification log to the persistent storage, responsive to a determination that an index of the page modification log is a predetermined value.

13. The system of claim 12, wherein the processor comprises a security logic to determine an access pattern of the active process based on a plurality of entries of the page modification log and compare the access pattern to stored pattern information associated with the active process to identify a potential security violation.

* * * * *